June 4, 1963  C. E. SHEETZ  3,092,196
ADJUSTABLE SPRING-BALANCED SCALE
Filed Dec. 29, 1958  3 Sheets-Sheet 1

INVENTOR
CHARLES E. SHEETZ
BY Hans G. Hoffmeister
ATTORNEY

June 4, 1963 C. E. SHEETZ 3,092,196
ADJUSTABLE SPRING-BALANCED SCALE
Filed Dec. 29, 1958 3 Sheets-Sheet 2
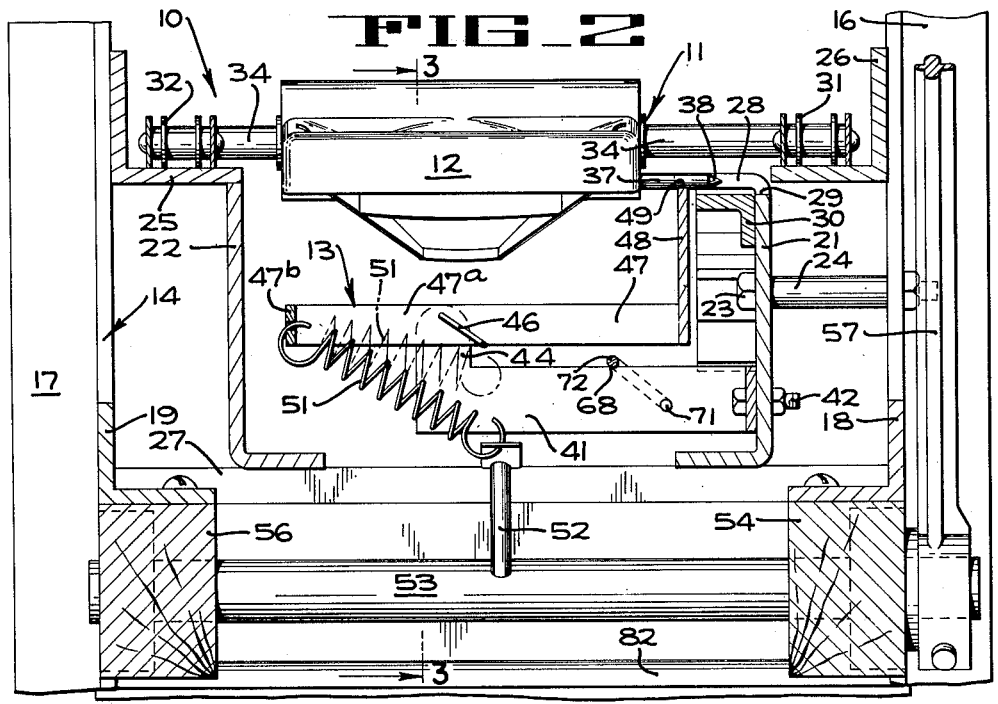
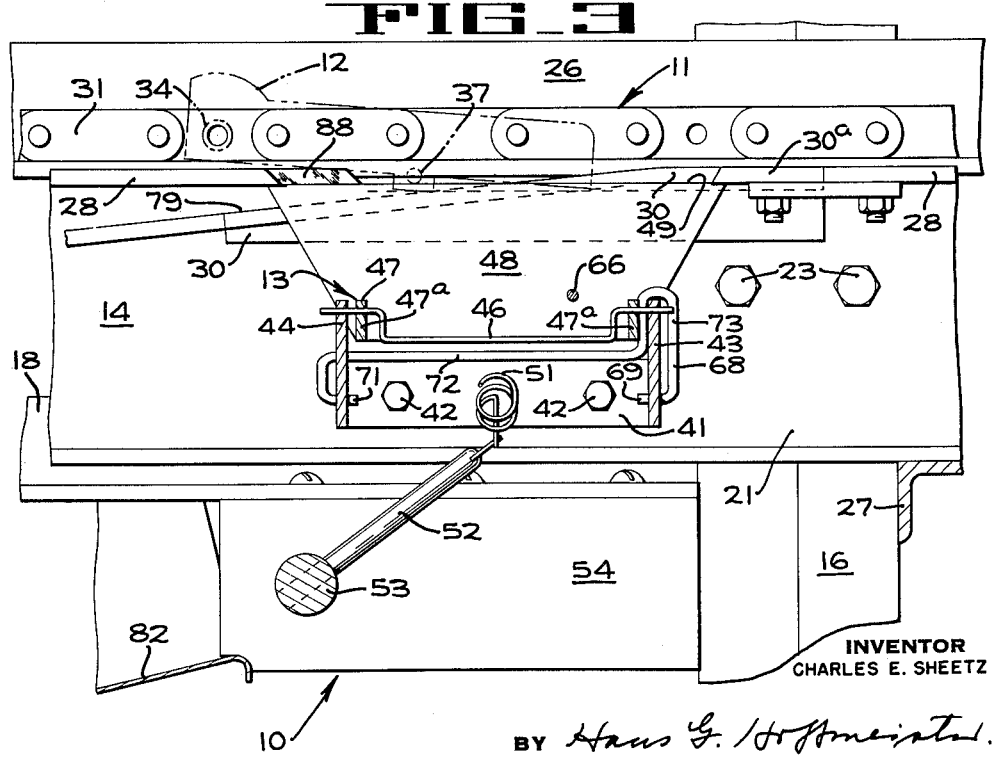
INVENTOR
CHARLES E. SHEETZ
BY Hans G. Hoffmeister
ATTORNEY June 4, 1963
C. E. SHEETZ
3,092,196
ADJUSTABLE SPRING-BALANCED SCALE
Filed Dec. 29, 1958
3 Sheets-Sheet 3
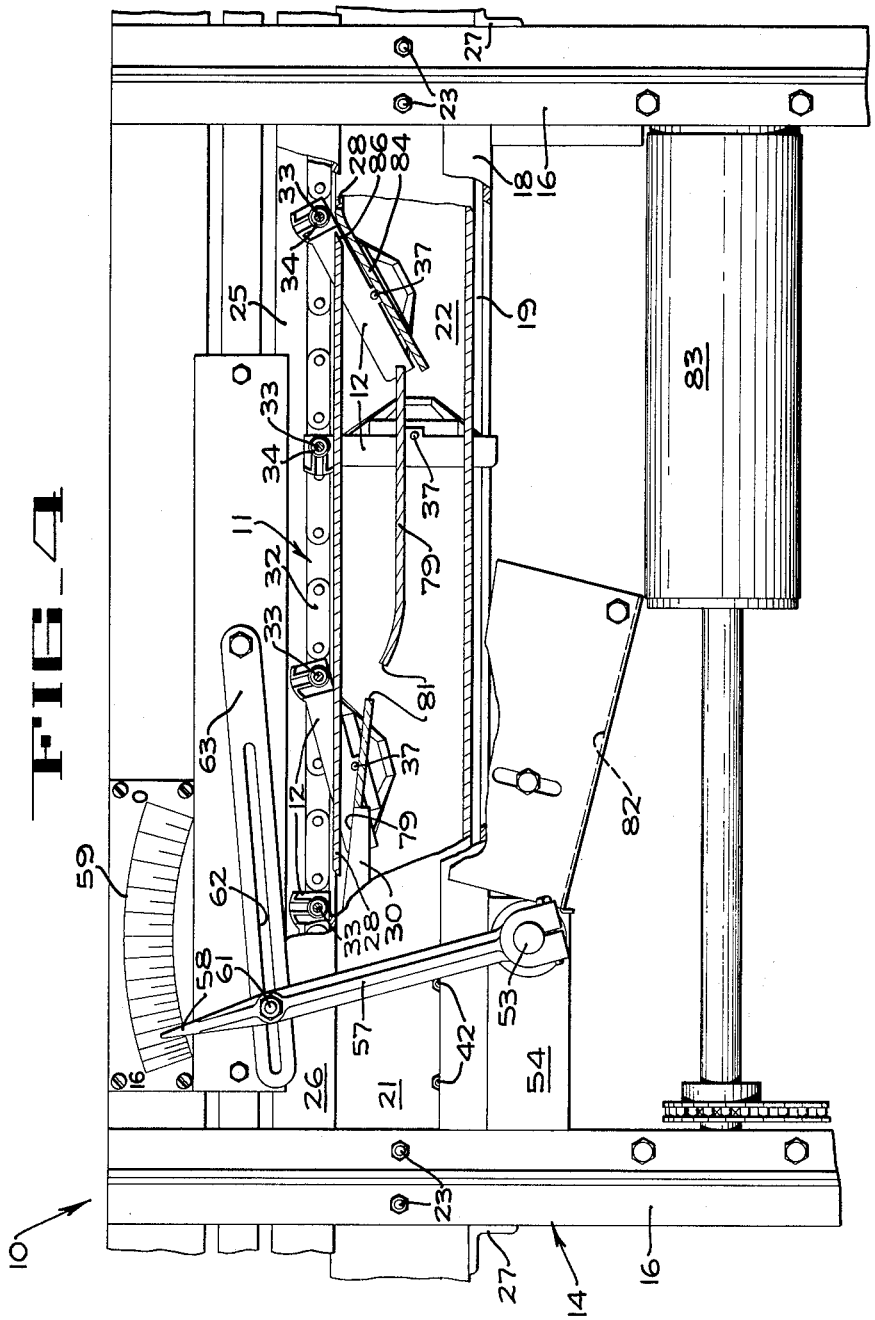
INVENTOR
CHARLES E. SHEETZ
BY Hans G. Hoffmeister.
ATTORNEY

3,092,196
ADJUSTABLE SPRING-BALANCED SCALE
Charles E. Sheetz, Woodstock, Va., assignor to FMC
 Corporation, a corporation of Delaware
Filed Dec. 29, 1958, Ser. No. 783,269
1 Claim. (Cl. 177—170)

The present invention appertains to grading or sorting machines and more particularly relates to machines that grade or sort according to weight.

A difficulty frequently encountered in the use of machines that grade articles into different weight groups is the comparative lack of sensitivity in the weighing units used in these machines, particularly in the lighter ranges of their operation. In weight grading machines employing spring-balanced scales, inaccuracies inherent in the springs frequently cause misgrading in the lighter groups of articles being graded.

It is, therefore, one object of the present invention to provide an improved weighing unit for a weight grading machine.

Another object of the invention is to provide a weighing machine which is an improvement over that disclosed in the patent of P. Van Wyk, No. 2,252,909, which patent is assigned to the assignee of the present invention.

Another object is to provide an improved weighing unit arranged to minimize the effect of inaccuracies in the weight-sensitive element on the grading or sorting operation.

Another object is to provide an improved weighing unit arranged to increase the sensitivity thereof by reducing the effective range of operation of the weight sensitive element.

Another object is to provide an improved weighing unit which is simple in design and inexpensive in construction.

These and other objects and advantages of the present invention will become apparent from the following description and the accompanying drawings, in which:

FIG. 1 is a perspective of a part of a weight grading machine of the present invention, showing one of the weighing units thereof, certain parts being broken away and others being shown in section.

FIG. 2 is a section taken along lines 2—2 of FIG. 1.

FIG. 3 is a section taken along lines 3—3 of FIG. 2.

FIG. 4 is a side elevation of a portion of the grading machine of FIG. 1, certain parts being broken away.

The weight grading machine 10 (FIG. 1) is arranged to grade and separate apples or similar articles into a plurality of groups of different weights. The machine 10 comprises an elongate conveyor 11 which includes a plurality of article carriers 12 and moves them past a succession of identical weighing units or scales 13 (only one being shown) which are spaced longitudinally relatively to the conveyor 11. Although the several scales 13 are identical in construction, they are adjusted to be actuated by different weight loads with the scale nearest the inlet end of the machine 10 set to be actuated only by the heaviest load that the machine 10 is intended to handle. The other scales, when taken in order from the inlet end to the discharge end of the machine, are set to be actuated by successively lighter loads. Each carrier 12 rides over one scale 13 after another without effect until the carrier 12 reaches a scale 13 which is adjusted to be actuated or tripped by the load supported by the particular carrier 12, which then discharges its load into a weight group determined by the particular scale.

The conveyor 11 and the scale 13 are supported by a frame 14 which includes vertical legs 16 and 17. Parallel, longitudinally extending angle members 18 and 19 are welded to the legs 16 and 17, respectively, and a longitudinally extending channel member 21 and an angle member 22 are secured to but spaced inward from the legs 16 and 17, respectively. Bolts 23 having spacers 24 thereon secure the channel member 21 to the legs 16 while the angle member 22 is welded to a conveyor guide rail 25. Additionally, the members 21 and 22 rest against transverse angle bars 27 bolted to the legs 16 and 17. The guide rail 25 and a parallel conveyor guide rail 26 are welded to the legs 17 and 16, respectively. The upper flange of the channel 21 serves as a track 28 to hold the carriers horizontal while they are being advanced to a scale. For reasons soon to be made apparent, a longitudinal slot 29 is provided in the track 28 adjacent each scale 13. An inclined track insert 30 (FIG. 3) is secured with its higher end flush with the flange 28 at the upstream end of each slot 29 and slopes downward to a position below and spaced from the flange 28 at the downstream end of the same slot 29.

The conveyor 11 comprises a pair of parallel spaced conveyor chains 31 and 32 arranged to ride along the horizontal flanges of the guide rails 26 and 25, respectively. Transverse carrier pivot bars 33 are secured at evenly spaced intervals to the chains 31 and 32 and each bar 33 pivotally supports the forward end of one of the carriers 12. Tubular spacers 34, on the bars 33, are disposed between the sides of the carriers 12 and the respectively adjacent conveyor chains to hold the carriers 12 in the desired lateral position relative to the chains 31 and 32. Each carrier 12 has a pocket 36 for supporting the article to be weighed. A hardened pin 37 having a conical outer end 38 projects rigidly from a lateral side of each carrier 12 and is arranged to ride along the track 28 to support the carrier 12, with the aid of the associated bar 33, in a horizontal or article supporting position.

Since all the scales 13 are identical in construction, description of one of the scales 13 and the manner in which it cooperates with the conveyor 11 will suffice for all.

The improved scale 13 (FIGS. 1, 2 and 3) comprises a U-shaped support bracket 41 which is secured to the channel member 21 by bolts 42 and is disposed directly below the upper run of the conveyor 11. Upwardly directed ears 43 and 44 of the bracket 41 are apertured to receive the ends of a spring steel pivot wire 46. Likewise, a U-shaped scale beam 47 having legs 47a and a connecting portion 47b is drilled to receive the wire 46 which serves as a fulcrum so that the beam 47 is supported on the bracket 41 for pivotal movement about the axis of the wire 46. An elongate scale beam blade 48 for imposing a portion of the weight of an article to be graded on the beam 47, is welded to the ends of the legs 47a of the scale beam 47 and extends longitudinally of the machine 10 adjacent and parallel to the channel 21. Whereas the scale beam 47 is low enough for the carriers 12 to pass freely thereover, the blade 48 projects upward from the ends of the legs 47a far enough to dispose the upper edge 49 of the blade 48 in horizontal alignment with the under surface of the upper, slotted flange 28 of the channel 21. As the pins 37 of the carriers 12 move off the main track 28 they slide down the inclined insert 30 onto the upper edge 49 of the blade 48 and thus are received gently thereupon, as will be explained more fully hereinbelow. The upstream end of the blade 48 projects under a short horizontal connecting portion 30a of the insert 30. The other end of the blade 48 projects under the downstream end of the associated slot 29 to hold the edge 49 below the plane of the upper surface of the track 28.

A spring 51 (FIGS. 1 and 2), which is the weight sensitive element of the scale 13, is connected at one end to the connecting portion 47b of the scale beam 47 to resist pivotal movement of the scale beam 47 in response to a downward force exerted against the blade 48. The other end of the spring 51 is anchored to the distal end of a rod 52 which is rigidly secured to and extends radially from a spring adjustment shaft 53. The line of action of the spring 51 describes a spring angle of less than 45° with a plane that includes the axis of the fulcrum and the point of connection of the spring 51 to the scale beam 47. The spring adjustment shaft 53 is journalled in bearing blocks 54 and 56 which are bolted to the angle members 18 and 19, respectively. Pivotal movement of the shaft 53 alters the distance of the distal end of the rod 52 from the pivot axis of the fulcrum and thereby changes the number of degrees of the above mentioned spring angle. An arm 57 is rigidly secured to the spring adjustment shaft 53 and its distal end is formed as a pointer 58 (FIG. 4) which is disposed adjacent an arcuate weight indicating dial 59. The dial is graduated in suitable weight increments, as, for example, 0 to 16 ounces.

To cause the scale 13 to be actuated, i.e., to cause the scale beam blade 48 to be depressed, by an article weighing fifteen ounces the arm 57 is pivoted to a position which disposes the pointer 58 opposite the fifteen ounce mark on the dial 59. FIG. 4 of the drawings shows the arm 57 approximately in this position. The arm 57 is locked in this position by tightening a bolt 61 which is screwed in the arm 57 and extends through a slot 62 in a strap 63 that is pivotally connected to the channel member 21. In order to correct for slight inaccuracies in the spring 51 (FIG. 1) which might cause the scale 13 to be actuated by a weight slightly greater or slightly less than the desired fifteen ounces when the arm 57 is locked in the above described position, a counterweight 64 (FIG. 1) is slidably mounted on a rod 66 which is welded to the scale beam blade 48 and to the connecting portion 47b of the scale beam 47 and extends transversely of the pivot wire 46. If the scale is actuated by a weight which is less than the preset fifteen ounces, the counterweight 64 is moved to the right of the pivot wire 46 as viewed in FIG. 1 and is locked by a thumb screw 67 in the position which causes the scale to be actuated by an article weighing exactly fifteen ounces. Conversely, if the scale is actuated by a weight which is heavier than the fifteen ounces, the counterweight 64 is moved the proper distance to the left of the pivot wire 46 and is locked in place by the thumb screw 67. Obviously the counterweight 64 is used only to compensate for inaccuracies in the spring 51, and the position of this counterweight 64 is not changed during operation of the machine after the proper initial adjustments have been made.

A scale lock 68, formed of spring steel wire and having its ends 69 and 71 journalled in holes drilled in the bracket 41 adjacent the scale beam blade 48, is provided for locking the scale beam 47 in a fixed position to temporarily disable the scale. The scale lock 68 includes an elongated beam wedging portion 72 and a handle 73. When it is desired to lock the scale beam 47 in a fixed position, the operator grasps the handle 73 and pivots the scale lock 68 in a counterclockwise direction (FIG. 1) to a vertical position thereby causing the resilient wedging portion 72 to push upwardly against the beam 47 to hold the same in fixed position against the horizontal portion of the track insert 30 and the track 28.

During operation of the grading machine 10, it is important that the pin 37 of each carrier 12 be gently transferred from the track 28 to the upper edge 49 of the scale beam blade 48 to achieve a more accurate weighing of the article. It is for this reason that the hereinabove mentioned insert 30 is provided. It includes a narrow, downwardly inclined track 79 (FIGS. 3 and 4) which exposes a large proportion of the upper edge 49 of the scale beam blade 48 for contact with the pin 37 of each carrier 12 and guides the pin 37 downwardly onto the edge 49 of the scale beam blade 48 thereby preventing an abrupt drop from the upper surface of the horizontal portion of the insert 30 to the edge 49. If the weight of the article in a pocket 36 whose pin 37 is thus imposed upon the scale beam blade 48 is sufficient to actuate the scale 13, when the pin moves off the scale beam blade 48 it will pass under that part of the track 28 which is immediately downstream from the actuated scale. The pin 37 continues to ride down the inclined track 79 until it reaches a slot 81 (FIG. 4) in the track 79 which allows the carrier 12 to swing downward to a vertical position, causing the article to fall free of the same. The article falls onto a chute 82 secured to the frame 14 and which guides the article onto a continuously driven discharge conveyor 83 that conveys the graded article to a suitable point of discharge.

Since the several scales 13 are positioned immediately below the path along which the carriers 12 move when the same are supported in horizontal or article supporting positions, in order to prevent interference it is necessary to re-set those carriers 12 which have discharged their loads and are in vertical, unloading position, i.e., they must be returned to their article supporting positions before they reach the adjacent downstream scale. For accomplishing this, an upwardly inclined track 84 (FIG. 4) is disposed between each two adjacent scales 13. Each track 84 is secured as by welding to the support member 21 in position to guide the pins 37 of each carrier 13 which has deflected the adjacent upstream scale 13 and has discharged its load. These pins 37 are guided upwardly by the track 84 through a slot 86 in the main horizontal track 28 thereby moving the pins 37 to a position on top of the track 28 and returning each of the empty carriers 12 to a horizontal position.

If a scale 13 is not actuated by the weight of an article in a carrier 12, the pin 37 of the carrier 12 is guided along the upper edge 49 of the scale beam blade 48 (FIG. 3) and moves into engagement with a transversely inclined knife edge 88. The knife edge 88 lies substantially in the plane of the edge 49 of the scale beam and cooperates with the point 38 (FIG. 1) of the pin 37 to guide the pin upward onto the upper surface of the track 28 beyond the slot 29 without permitting the carrier to discharge its load. The full carrier continues to advance until it reaches a scale which is actuated by the weight of the article in the carrier 12, permitting the carrier 12 to discharge its load. Thereafter, the carrier is returned to a horizontal position as has already been described.

As mentioned previously, the scale 13 of the present invention is especially designed to minimize any inaccuracies which might be inherent in the spring 51. It should first be pointed out that the magnitude of inaccuracies in the rate of a spring is directly proportional to the stretching or deflection of the spring. Thus, it is desirable to limit the deflection of the spring to a very small amount, especially when weighing the lighter articles.

It is apparent that clockwise movement of the shaft 53 as viewed in FIG. 1 will raise the lower end of the spring and thus move the spring 51 into a more nearly horizontal position, as shown in phantom in FIG. 2. One result of placing the spring in this position is to shorten and consequently to reduce tension of, the spring 51 and thereby adapt the scale 13 for actuation by a lighter article. It will also be noted that when the spring 51 is set in this position for weighing light articles, downward movement of the scale beam far enough for the pin 37 supported thereby to pass under the track 28 causes the spring 51 to be stretched, or deflected, a considerably smaller amount, because the anchor point of the lower end of the spring is closer to the pivot axis of the scale beam when the spring is in the more nearly horizontal position. Because of this small amount of deflection of the spring 51, inaccuracies in the spring 51 are minimized. The effect of inaccuracies of the spring 51 is further reduced because the lever arm between the pivot wire 46 and the point of connection of the spring 51 to the scale beam is shorter than the lever arm between the pivot wire 46 and the scale beam blade 48, the effect of which is that the spring is stretched less for any given movement of the scale beam blade.

Although the weight grading machine 10 has been described as having one article conveyor 11, the placement of the scales 13 directly below the upper run of the conveyor makes it possible to use several parallel conveyors which are disposed closely adjacent each other. In such a machine it is desirable to use one spring adjustment shaft 53 for each bank of scales which are set for a common grade.

From the foregoing description it is apparent that by arranging the scale so that the spring experiences less deflection than in previously known grading machines, greater accuracies of the scale of the present invention is attained. Furthermore, since spring deflection is least when the scale is adjusted to respond to the weight of the lightest articles, the scale is most sensitive when adjusted for operation in the lightest range, where the least tolerance is permissible. The construction of the scale beam is also arranged to minimize the effect of spring errors by making the distance between the scale pivot point and the point of connection of the spring less than the distance between the pivot point and the point at which the cup is supported by the beam.

While one embodiment of the present invention has been shown and described, it will be understood that various changes and modifications may be made without departing from the spirit of the invention or the scope of the appended claim.

The present invention and the manner in which the same is to be used having thus been described, what is claimed as new and desired to protect by Letters Patent is:

In a weight-grading machine, a scale comprising a scale beam, means mounting said scale beam for pivotal movement about a horizontal pivot axis, a spring having one end connected to said scale beam a fixed predetermined distance from said mounting means, a scale beam blade carried by said scale beam on the other side of said mounting means, said scale beam blade being arranged to provide support for articles to be graded, a shaft rotatably mounted below said beam and fixed against axial movement with the axis of the shaft being substantially horizontal and normal to the pivot axis, a rod secured to and radially projecting from said shaft and having a distal end, said rod being movable upon rotational movement of said shaft between upper and lower positions with said distal end respectively spaced closer to and farther from said beam, means at one end of said shaft for fixing said shaft in a particular rotative position and indicating a predetermined weight range of said articles to be graded, the lower end of said spring being connected to and movable with said distal end of said rod with the spring being maintained under a different degree of tension between said beam and rod in each position of the rod to make the scale responsive to articles whose weights are within various predetermined weight ranges, said shaft being rotated in one direction to decrease the angle between the line of action of said spring with the plane that includes said pivot axis and the point of connection of the spring to the scale beam to make the scale responsive to lighter articles within said ranges and to increase the sensitivity of said scale while the ratio of said distance between said spring connection to said beam and said pivot axis to the distance between said blade and said pivot axis remains constant.

References Cited in the file of this patent
UNITED STATES PATENTS

| | | |
|---|---|---|
| 915,468 | Nilson | Mar. 16, 1909 |
| 1,633,002 | Cutler | June 21, 1927 |
| 2,252,909 | Van Wyk | Aug. 19, 1941 |
| 2,859,956 | Meriam | Nov. 11, 1958 |